United States Patent

Inoue

Patent Number: 5,461,702
Date of Patent: Oct. 24, 1995

[54] METHOD OF AN APPARATUS FOR PROCESSING IMAGE DATA

[75] Inventor: Yoshiaki Inoue, Kanagawa, Japan

[73] Assignee: Fuji Photo Film Co., Ltd., Kanagawa, Japan

[21] Appl. No.: 316,371

[22] Filed: Oct. 3, 1994

Related U.S. Application Data

[63] Continuation of Ser. No. 978,393, Nov. 18, 1992, abandoned.

[30] Foreign Application Priority Data

Nov. 19, 1991 [JP] Japan ................... 3-303538

[51] Int. Cl.$^6$ ................... G06K 15/06
[52] U.S. Cl. ................... 395/109; 395/117
[58] Field of Search ................... 395/101, 102, 395/109, 117; 382/54, 55; 341/1, 56, 57; 345/115, 116, 136; 358/530, 532, 538, 540, 450, 451, 453, 462, 467

[56] References Cited

FOREIGN PATENT DOCUMENTS 2134352 8/1984 United Kingdom .

OTHER PUBLICATIONS

Proceedings of the SPIE—Visual Communications and Image Processing '88, "Fast Adaptive Interative Image Restoration Algorithms", Efstratiadis S N & Katsaggelos A K, vol. 1001, P.1, Nov. 9, 1988.

Frontiers of Engineering and Cmputing in Health–Care 1983. Proceedings of the 5th Annual Conference, Gehrad G. C. & Miller W. T. "Radiograhic Feature Enhancement Information Content and Dose Reduction in Mammography and Cardiac Angiography" Sep. 10, 1983, pp. 161–165.

Primary Examiner—Arthur G. Evans
Attorney, Agent, or Firm—Sughrue, Mion, Zinn, Macpeak & Seas; Richard C. Turner

[57] ABSTRACT

Mask size data M and a sharpness enhancement coefficient K are set in accordance with the pixel density of image data $S_{ij}^*$ to be output. The image data $S_{ij}^*$ is determined as $$S_{ij}^* = S_{ij} + K \cdot (S_{ij} - U_{ij})$$

using the mask size data M and the sharpness enhancement coefficient K, wherein the smoothed image data $U_{ij}$ is defined by the following equation:

$$U_{ij} = \sum_{k=i-L}^{i+L} \cdot \sum_{L=j-L}^{j+L} \cdot S_{KL}/M_2$$

[wherein $L = (M - 1)/2$]

12 Claims, 7 Drawing Sheets

FIG.4

| PIXEL DENSITY DATA ρ | 12 LINES/mm | 14 LINES/mm | 16 LINES/mm | 24 LINES/mm | 32 LINES/mm | 48 LINES/mm |
|---|---|---|---|---|---|---|
| MASK SIZE DATA M | 3 | 3 | 3 | 5 | 7 | 11 |
| SHARPNESS ENHANCEMENT COEFFICIENT K | 6 | 6 | 6 | 2.5 | 1.5 | 1 |

FIG. 6

| No. | A | B | C (A−B) | D (C+E) | E |
|---|---|---|---|---|---|
| 1 | a | 0 | a | a+0 = a | 0 |
| 2 | b | 0 | b | a+b = a+b | a |
| 3 | c | 0 | c | a+b+c = a+b+c | a+b |
| 4 | d | a | d−a | a+b+c+d−a = b+c+d | a+b+c |
| 5 | e | b | e−b | b+c+d+e−b = c+d+e | b+c+d |
| 6 | f | c | f−c | c+d+e+f−c = d+e+f | c+d+e |
| 7 | g | d | g−d | d+e+f+g−d = e+f+g | d+e+f |
| 8 | h | e | h−e | e+f+g+h−e = f+g+h | e+f+g |
| 9 | i | f | i−f | f+g+h+i−f = g+h+i | f+g+h |

FIG. 7

| $S_{i-1\,j-1}$ | $S_{i-1\,j}$ | $S_{i-1\,j+1}$ |
|---|---|---|
| $S_{i\,j-1}$ | $S_{i\,j}$ | $S_{i\,j+1}$ |
| $S_{i+1\,j-1}$ | $S_{i+1\,j}$ | $S_{i+1\,j+1}$ |

METHOD OF AN APPARATUS FOR PROCESSING IMAGE DATA

This is a Continuation of application Ser. No. 07/978,393, filed Nov. 18, 1992 now abandoned.

BACKGROUND OF THE INVENTION

1. Field of the Invention

The present invention relates to a method of and an apparatus for processing image data, wherein, when image data to be outputted is processed for smoothing or enhancement of sharpness, the same processing result can be obtained independent of pixel density, by processing the image data based on the pixel density of the outputted image data.

2. Description of the Related Art

A system is known which causes an optical system to read image information of a copy or subject to thereby produce image data which then subjects the produced image data to various image processes before being outputted to a printer or the like. This type of system is widely used in the printing and platemaking fields in particular.

Now, personal computers, work stations, etc. have experienced rapid advances in recent years and even image data. For example, characters and images have conventionally been cut and pasted by hand to produce a copy. However, DTP (Desk Top Publishing) has become widespread. DTP transfers image information from an image information input/output device to a work station, where the transferred image information can be manipulated and composed. In particular, a composing process in the printing field is effected by a composing system using the work station or the like or by a total scanner or the like.

It is sometimes necessary to perform a conversion of the pixel density of image data representing the object to be processed between the image information input/output device and the work station or the like when the work station or the like is used. That is, a pixel density suited to the image information input/output device and a pixel density suited to the work station or the like may be different from each other. It is therefore necessary to adjust these pixel densities.

On the other hand, the input/output device referred to above sometimes processes the image data to smooth it or enhance its sharpness. Thus, when the conversion of the pixel density is effected upon processing of the image data for smoothing and enhancement of sharpness, this results in different processes.

SUMMARY OF THE INVENTION

It is therefore an object of the present invention to provide a method of and an apparatus for processing image data, wherein, when image data to be outputted is processed for smoothing and enhancement of sharpness, the substantially same processing result can be obtained at all times independent of the pixel density of the image data.

According to a first aspect of the present invention, a method of smoothing image data set and outputted at a predetermined pixel density, using image data surrounding the image data, is provided, comprising the step of processing the image data for smoothness, while using the surrounding image data falling within an area set so as to be substantially proportional to the predetermined pixel density.

According to a second aspect of the present invention, a method of smoothing image data is provided, wherein the area represented by M is set so as to meet the following equation:

$$(1/\rho)M = C \quad (C: \text{constant value})$$

where $\rho$=pixel density

M=mask size substantially proportional to the predetermined pixel density.

According to third aspect of the present invention, a method of smoothing image data is provided, wherein the constant value C is set so as to fall within a range of 200 μm to 250 μm.

According to a fourth aspect of the present invention, a method of smoothing image data is provided, wherein image data $S_{ij}$ (i=1, ... m, j=1, ... n) is converted into smoothed image data $U_{ij}$ processed as defined by the following equation, using M×N surrounding image data set by mask size data M, N each substantially proportional to the pixel density:

$$U_{ij} = \sum_{k=i-L}^{i+L} \cdot \sum_{L=j-P}^{j+p} \cdot S_{kL}/(L \cdot P)$$

[where $L = (M - 1)/2$, $P = (N - 1)/2$].

According to a fifth aspect of the present invention, a method of processing image data S set and outputted at a predetermined pixel density for enhancement of sharpness, using image data surrounding the image data S, is provided, comprising the steps of smoothing the image data S, using the surrounding image data falling within an area set so as to be substantially proportional to the predetermined pixel density to thereby produce smoothed image data U, and thereafter producing sharpness-enhanced image data S* represented as S*=S+K·(S–U), using the image data S, the smoothed image data U and a predetermined sharpness enhancement coefficient K.

According to a sixth aspect of the present invention, a method of processing image data S set and outputted at a predetermined pixel density for enhancement of sharpness, is provided, wherein the mask size represented by M is set so as to meet the following equation:

$$(1/\rho)\cdot M = C \quad (C: \text{constant value})$$

where $\rho$=pixel density

M=mask size substantially proportional to the predetermined pixel density.

According to a seventh aspect of the present invention, a method of processing image data S set and outputted at a predetermined pixel density for enhancement of sharpness, is provided, wherein the constant value C is set so as to fall within a range of 200 μm to 250 μm.

According to an eighth aspect of the present invention, a method of processing image data S set and outputted at a predetermined pixel density for enhancement of sharpness, is provided, wherein the sharpness enhancement coefficient K is set depending on the range of the surrounding image data.

According to a ninth aspect of the present invention, a method of processing image data S set and outputted at a predetermined pixel density for enhancement of sharpness, is provided, wherein the relationship between the sharpness enhancement coefficient K and the mask size M is set onto a curve which passes through points close to points (K, M)=(6, 3), (2.5, 5), (1.5, 7), (1, 11).

According to a tenth aspect of the present invention, a method of processing image data S set and outputted at a predetermined pixel density for enhancement of sharpness, is provided, wherein image data $S_{ij}$ (i=1, ... m, j=1, ... n) is converted into smoothed image data $U_{ij}$ processed as defined by the following equation, using M×N surrounding image data set by mask size data M, N each substantially proportional to the pixel density.

$$U_{ij} = \sum_{k=i-L}^{i+L} \cdot \sum_{L=j-P}^{j+P} \cdot S_{kL}/(L \cdot P)$$

[where $L = (M - 1)/2$, $P = (N - 1)/2$]

According to an eleventh aspect of the present invention, a sharpness enhancement processing apparatus for processing image data S set and outputted at a predetermined pixel density for enhancement of sharpness, using image data surrounding the image data S, is provided, comprising range setting means for setting the area of the surrounding image data based on the predetermined pixel density, smoothed image data generating means for processing the image data S for smoothness using the surrounding image data falling within the area set by the range setting means to thereby produce smoothed image data U, and image data generating means for generating sharpness-enhanced image data S* defined as S*=S+K·(S−U), using the image data S, the smoothed image data U and a predetermined sharpness enhancement coefficient K.

According to a thirteenth aspect of the present invention, a sharpness enhancement processing apparatus is provided, wherein the range of the surrounding image data and the sharpness enhancement coefficient K are set as a look-up table corresponding to the pixel density.

It is a still further object of the present invention to provide a sharpness enhancement processing apparatus wherein the smoothed image data generating means comprises a plurality of storing means for storing therein image data as line data arranged in a main scanning direction, selecting means for selecting image data arranged in the main scanning direction and an auxiliary scanning direction corresponding to the range of the surrounding image data from the storing means, adding means for adding the selected image data together, and dividing means for dividing the added image data by the number of the selected image data.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 4 is a view for describing a data table stored in a storage unit of the sharpness enhancement processing circuit shown in FIG. 2;

FIG. 6 is a view for describing image data at respective points in the auxiliary-scanning direction adding unit shown in FIG. 3; and FIG. 7 is a view for describing image data processed for enhancement of sharpness.

DETAILED DESCRIPTION OF THE PREFERRED EMBODIMENTS

Figure 1:
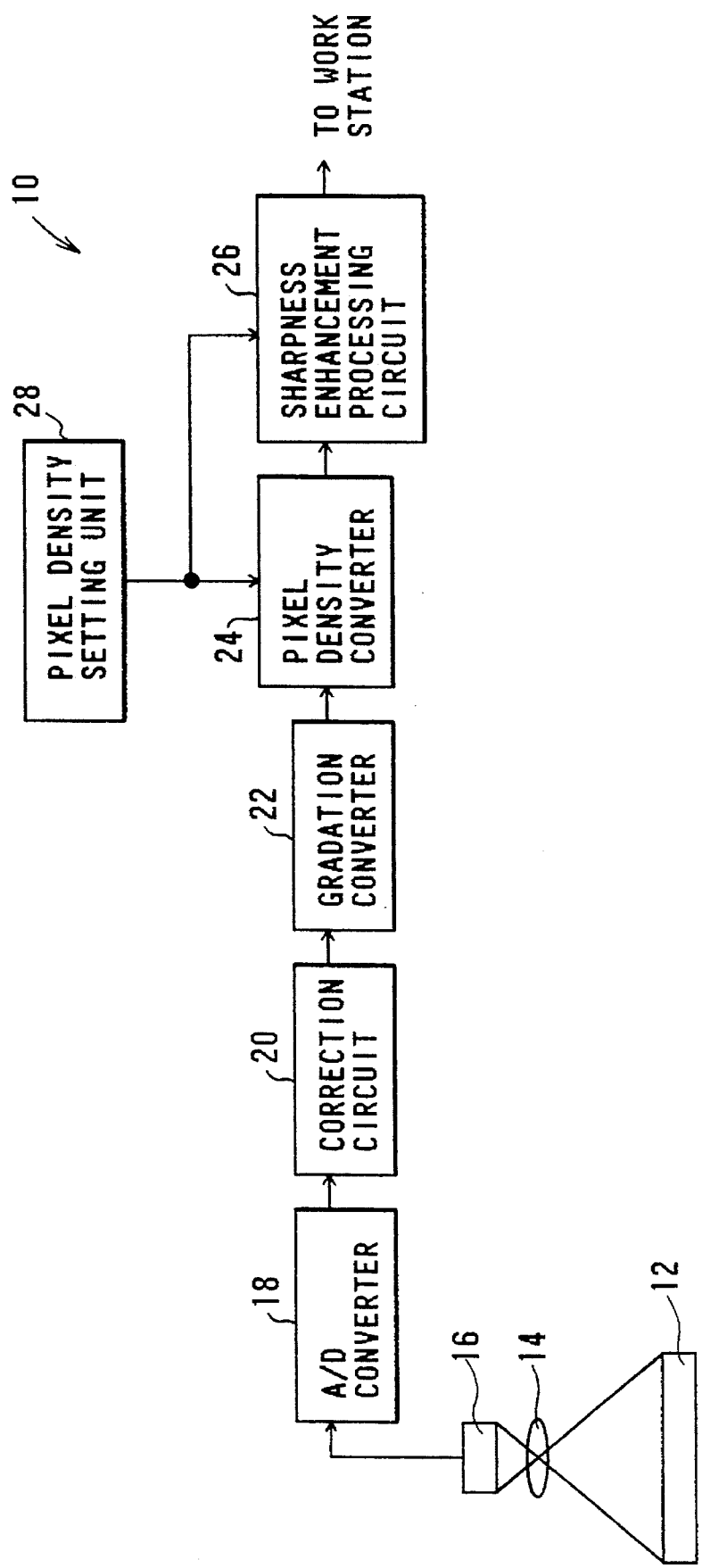
FIG. 1 is a schematic block diagram showing the structure of an image data processing apparatus according to one embodiment of the present invention.

FIG. 1 is a block diagram schematically showing the structure of an image data processing apparatus 10 according to one embodiment of the present invention. In the image data processing apparatus 10, an image recorded on a copy or subject 12 which is fed in an auxiliary scanning direction, is scanned or read in a main scanning direction by a CCD 16 via a condenser lens 14. The read image data is subjected to predetermined processing and transferred to a work station or the like. Incidentally, the work station or the like processes the image data for predetermined editing and transmits the same to an output device such as a printer or the like.

The image data processing apparatus 10 comprises an A/D converter 18 for converting image data converted into an electrical signal by the CCD 16 into a digital signal, a correction circuit 20 for processing the image data converted into the digital signal for compensation for the dark current caused by the CCD 16, compensation for shading caused by a read optical system, etc., a gradation converter 22 for converting the gradation of the image data, a pixel density converter 24 for converting a pixel density of the image data into a pixel density processable by the work station or the like, a sharpness enhancement processing circuit 26 for processing the image data for enhancement of sharpness, and a pixel density setting unit 28 for setting a desired pixel density and for supplying data about the set pixel density to the pixel density converter 24 and the sharpness enhancement processing circuit 26. Incidentally, the pixel density converter 24 effects pixel density converting processes such as an image data thinning process, an interpolating process, etc.

In the sharpness enhancement processing circuit 26, the image data is processed in principle for enhancement of sharpness in the following manner. That is, let's now consider that the image data of the copy 12 comprises m pixels arranged along the main scanning direction and n pixels arranged along the auxiliary scanning direction. Further, the image data corresponding to the respective pixels is represented as $S_{ij}$ (i=1 ... m, j=1 ... n). In the sharpness enhancement processing circuit 26, the image data $S_{ij}$ is regarded as the center and M×M (M: mask size data, M≤m, n) image data around the image data $S_{ij}$ are retrieved along the main and auxiliary scanning directions. The image data thus retrieved are then smoothed, thereby producing smoothed image data $U_{ij}$ represented as follows:

$$U_{ij} = \sum_{k=i-L}^{i+L} \cdot \sum_{L=j-L}^{j+L} \cdot S_{kL}/M^2 \tag{1}$$

[where $L = (M - 1)/2$]

Next, image data $S_{ij}*$ processed for sharpness enhancement is generated by using the image data $S_{ij}$, the smoothed image data $U_{ij}$ and a given sharpness enhancement coefficient K as follows:

$$S_{ij}^* = S_{ij} + K \cdot (S_{ij} - U_{ij}) \qquad (2)$$

Figure 2:
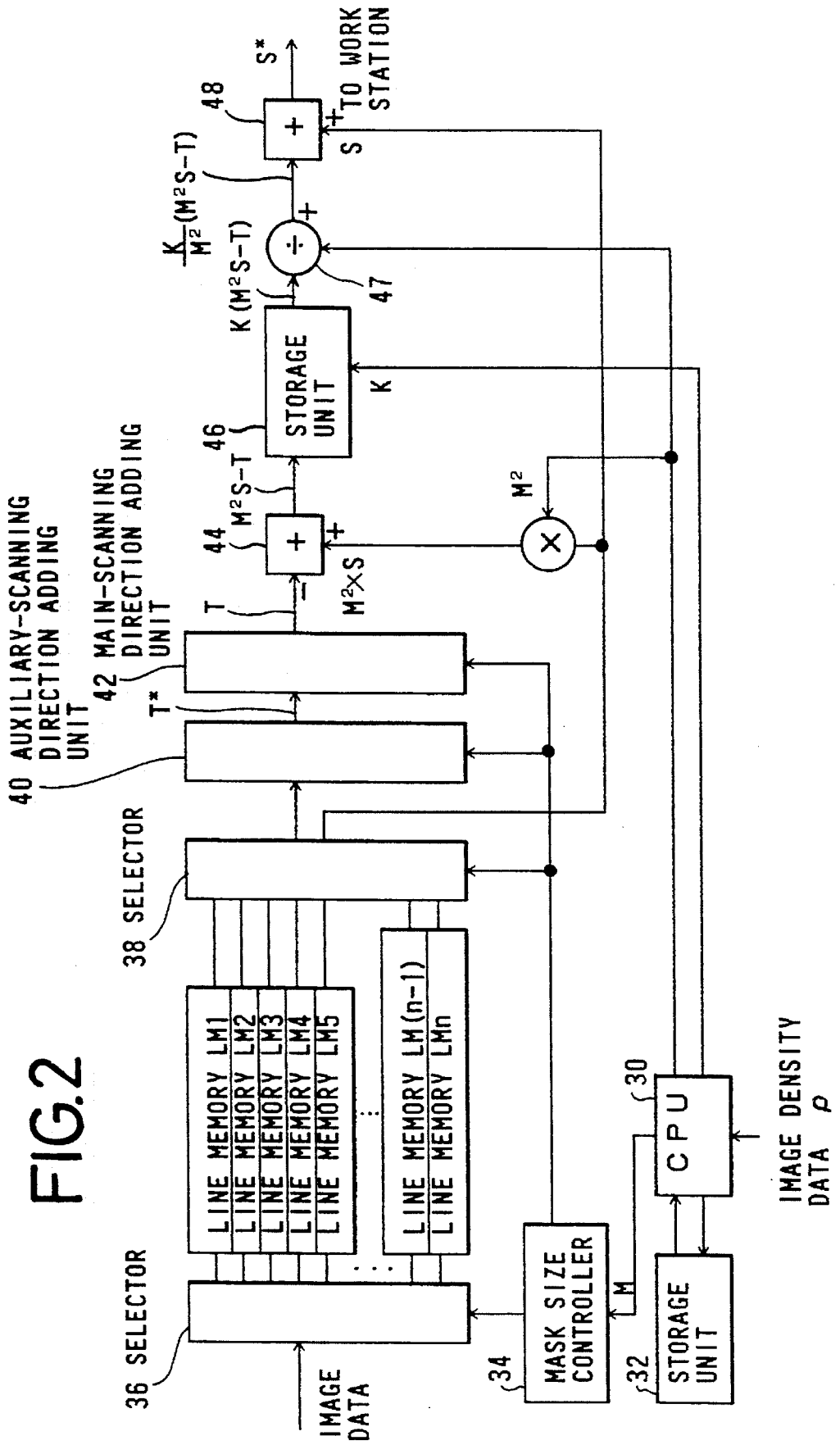
FIG. 2 is a detailed block diagram illustrating the structure of a sharpness enhancement processing circuit of the image data processing apparatus shown in FIG. 1.

Incidentally, the mask size data may be processed so as to be arranged M in the main scanning direction and N in the auxiliary scanning direction (M≠N) upon generation of the image data $S_{ij}^*$. In this case M may be set to fall between j−P and j+P (P=(N−1)/2) (i.e., j−P≦ M≦j+P (P=(N−1)/2) and $M^2$ may be se FIG. 2 is a block diagram showing the structure of the sharpness enhancement processing circuit 26. The sharpness enhancement processing circuit 26 comprises a CPU 30 for determining a sharpness enhancement coefficient K and mask size data M based on pixel density data ρ supplied from the pixel density setting unit 28, a storage unit 32 for storing therein the sharpness enhancement coefficient K and the mask size data M determined based on the pixel density data ρ, and a mask size controller 34 for outputting a control signal in response to the mask size data M. Further, the sharpness enhancement processing circuit 26 also includes a plurality of line memories LM1, LM2 . . . LMn for storing image data therein for each main scanning line of the original image 12. Selectors 36, 38 are used, respectively, to store image data in a predetermined line memory LMn (n=1, 2, . . . ) in response to the control signal supplied from the mask size controller 34 and to select desired image data from the predetermined line memory LMn. An auxiliary-scanning direction adding unit 40 and a main-scanning direction adding unit 42 are included for adding image data in the auxiliary and main scanning directions, respectively, to thereby generate smoothed image data $U_{ij}$. The circuit 26 further includes a multiplier 43 for multiplying image data $S_{ij}$ outputted from the selector 38 by the square of the mask size data M. An adder 44 then adds the data output from the multiplier 43 to the smoothed image data $U_{ij}$, which is output from the main-scanning direction adding unit 42 and subjected to a sign inversion. Further, a storage unit 46 is provided for storing a table indicative of preset image data therein, for selecting predetermined image data based on the sharpness enhancement coefficient K determined by the CPU 30 and the image data output from the adder 44, and for outputting the same therefrom. Lastly, the circuit 26 includes a divider 47 for dividing the image data output from the storage unit 46 by the square of the mask size data M determined by the CPU 30, and an adder 48 for adding the image data output from the divider 47 to the image data $S_{ij}$ output from the selector 38. Here, the adder 48 outputs $S_{ij}^*$ and supplies it to the work station or the like.

Figure 3:
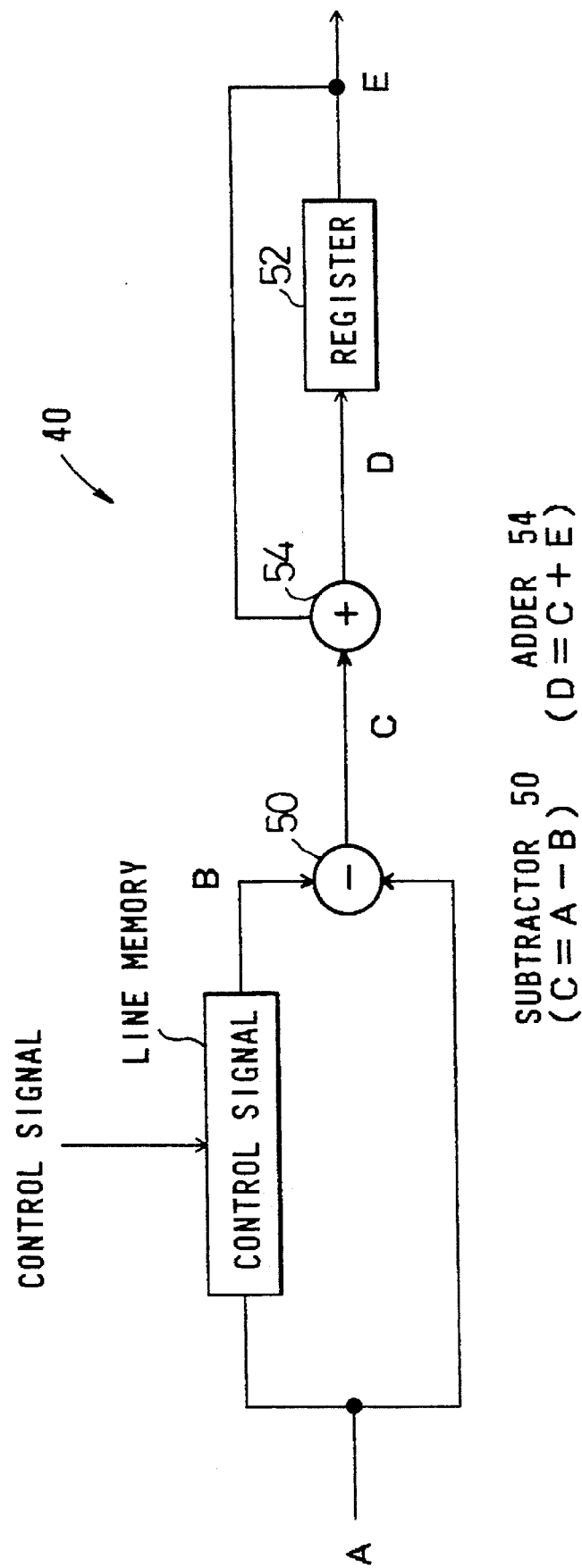
FIG. 3 is a detailed block diagram depicting the structure of an auxiliary-scanning direction adding unit of the sharpness enhancement processing circuit shown in FIG. 2.

FIG. 3 shows the configuration of the auxiliary-scanning direction adding unit 40. The auxiliary-scanning direction adding unit 40 comprises a line memory LM a substracter 50, a register 52 and an adder 54. The line memory LM stores image data supplied from the line memories LM1 through LMn as image data fed in the auxiliary scanning direction. The subtractor 50 subtracts image data which is output from the line memory LM and whose given number of pixels is shifted, from the image data output from the line memories LM1 through LMn. The register 52 temporarily stores therein image data to be output to the main scanning direction adding unit 42. The adder 54 adds the output of the subtractor 50 to the output of the register 52 so as to re-output the result of addition to the register 52.

On the other hand, the main-scanning direction adding unit 42 is constructed such that a shift register is used as an alternative to the line memory LM of the auxiliary-scanning direction adding unit 40. Other elements of unit 42 are identical to those employed in the auxiliary-scanning direction adding unit 40, and their description will therefore be omitted.

The image data processing apparatus 10 according to the present embodiment is basically constructed as described above. The operation of the image data processing apparatus 10 will now be described below.

Image information which has been recorded on the copy 12, is first read by the CCD 16 using the condenser lens 14. The read image information is thereby converted into an analog signal. The analog signal is converted into image data serving as a digital signal by the A/D converter 18, followed by transfer to the correction circuit 20. The correction circuit 20 processes the image data for the correction relative to the dark current caused by the CCD 16, the correction of shading caused by the read optical system, etc. The gradation of the image data, which has been subjected to the above processing, is converted into desired gradations in the gradation converter 22. Thereafter, the pixel density converter 24 converts the pixel density of the image data into a pixel density readable by an external work station or the like for effecting an editing process of the image data. Here, the pixel density converter 24 performs pixel density converting processes such as a thinning process (reduction), a linear interpolating process, an Hermite interpolating process (enlargement), etc. on the image data based on the pixel density data ρ output from the pixel density setting unit 28.

Next, the sharpness enhancement processing circuit 26 processes the image data subjected to the pixel density conversion for enhancement of sharpness. This process will be described in accordance with circuits shown in FIGS. 2 and 3.

The CPU 30 first reads corresponding mask size data M and a corresponding sharpness enhancement coefficient K from the storage unit 32 in response to the pixel density data ρ supplied from the pixel density setting unit 28.

FIG. 4 shows a data table which has been stored in the storage unit 32. In FIG. 4, for example, 12 lines/mm represent pixel density data ρ in the case where an image is made up of 12 scanning lines per mm. The mask size data M for generating smoothed image data U, with respect to the pixel density data ρ is set to 3. In this case, the size of one pixel is:

$$1/12 \approx 83 \ \mu m \qquad (3)$$

Therefore, an output image range for producing the smoothed image data U is:

$$83 \times 3 = 249 \ \mu m \qquad (4)$$

Similarly, mask size data M with respect to other pixel density data ρ are set in such a manner that the output image range falls between 200 μm and 250 μm. That is, the mask size data M is set so as to be substantially proportional to the pixel density data ρ. Thus, the output image range for generating the smoothed image data U is set so as to be substantially constant in the range of 200 μm to 250 μm. Therefore, a process for obtaining image data S* processed for sharpness enhancement in accordance with the equation (2) can be effected within the same output image range. Accordingly, the same result of processing can be obtained irrespective of the pixel density. Incidentally, the range of 200 μm to 250 μm represents the optimum range judging from visual characteristics of a human being.

Figure 5:
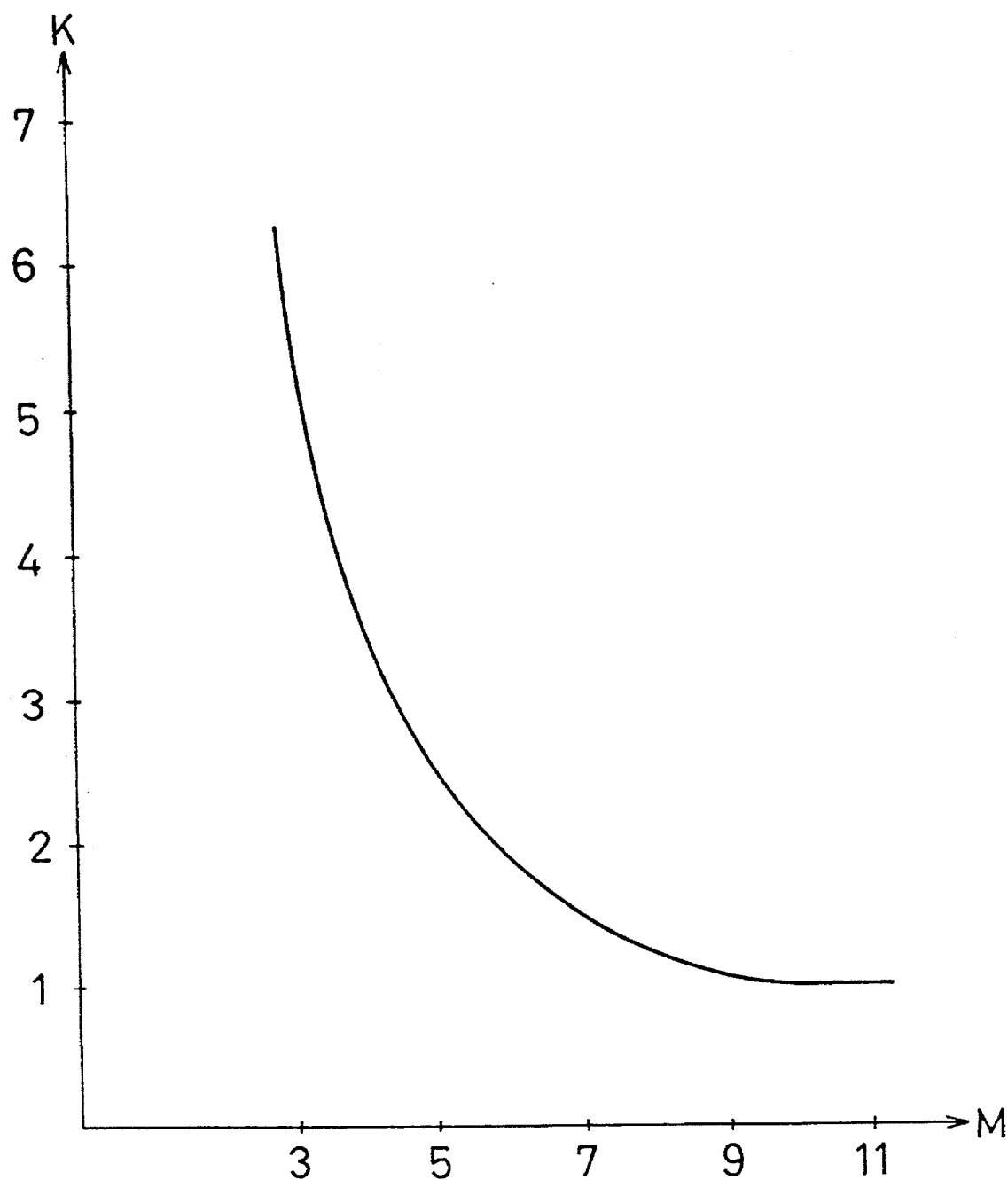
FIG. 5 is a view for describing the relationship between mask size data and sharpness enhancement coefficients shown in FIG. 4.

FIG. 5 is a graph for describing the relationship between the mask size data M and the sharpness enhancement coefficient K. This graph shows the relationship between the mask size data M and the sharpness enhancement coefficient K for obtaining a sharpness enhancing process equivalent to that in the case where the mask size data M is set to 11 (M=11) and the sharpness enhancement coefficient K is set to 1 (K=1). Thus, the sharpness enhancing process depends on the sharpness enhancement coefficient K as well as the mask size data M. The relationship between the pixel density data ρ, the mask size data M and the sharpness enhancement coefficient K is shown in the data table of FIG. 4.

The mask size data M which has been read from the storage unit 32 by the CPU 30, is supplied to the mask size controller 34 and the sharpness enhancement coefficient K is supplied to the storage unit 46. In this case, the pixel density, the mask size data M and the sharpness enhancement coefficient K will be described below as being 12 lines/mm, 3 and 6, for example, respectively.

The mask size controller 34 first controls the selector 36 so as to successively connect the pixel density converter 24 (FIG. 1) to the three line memories LM1 through LM3 (because M=3). Thus, the image data output from the pixel density converter 24 is stored in each of the line memories LM1 through LM3 for each main scanning line. The mask size controller 34 then controls the selector 38 so as to successively output image data to the auxiliary-scanning direction adding unit 40 from the respective line memories LM1 through LM3 and so as to output the central image data $S_{ij}$ for producing the image data $S_{ij}^*$ to the adders 44, 48 to be described later.

The auxiliary-scanning direction adding unit 40 reads image data, at the same main scanning positions, of the line memories LM1 through LM3 in the auxiliary scanning direction. Then, the read image data are successively stored in the line memory LM as image data arranged in the auxiliary scanning direction and supplied to the subtractor 50 in succession. In response to the control signal output from the mask size controller 34, the line memory LM delays the image data by a time interval corresponding to three pixels because the mask size data M is 3, and outputs the delayed image data to the subtractor 50. The output of the subtractor 50 is supplied to the register 52 via the adder 54 and added to the adder 54 again.

FIG. 6 shows image data at respective points (A through E) in the auxiliary-scanning direction adding unit 40 at the time that the column of image data in the main scanning direction, which are supplied from the selector 38, is represented by a through i. Incidentally, a, b, c, . . . are expressed by the following equations respectively:

$$a = [S_{i-1,1}, S_{i-1,2}, \ldots S_{i-1,j}, \ldots S_{i-1,n}] \quad (5)$$

$$b = [S_{i,1}, S_{i,2}, \ldots S_{i,j}, \ldots S_{i,n}] \quad (6)$$

$$c = [S_{i+1,1}, S_{i+1,2}, \ldots S_{i+1,j}, \ldots S_{i+1,n}] \quad (7)$$

Here, the main-scanning direction adding unit 42 is supplied with the image data at the point E. Thus, an image data column $T_i^*$ is output from the auxiliary-scanning direction adding unit 40 in accordance with the relationship shown in FIG. 6 assuming that image data $S_{i-1,j-1}$ through $S_{i+1,j+1}$ are arranged as shown in FIG. 7. The image data column $T_i^*$ is expressed as follows:

$$\begin{aligned} T_i^* &= a + b + c \\ &= [(S_{i-1,1} + S_{i,1} + S_{i+1,1}), \ldots, \\ &\quad (S_{i-1,j} + S_{i,j} + S_{i+1,j}), \ldots, \\ &\quad (S_{i-1,n} + S_{i,n} + S_{i+1,n})] \\ &= [T_{i1}^*, T_{i2}^*, \ldots T_{ij}^*, \ldots T_{in}^*] \end{aligned} \quad (8)$$

where $T_{ij}^* = (S_{i-1,j} + S_{i,j} + S_{i+1,j})$ (9)

Similarly, in the main-scanning direction adding unit 42, image data $T_{ij}$ added together within a mask, i.e., in-mask added image data $T_{ij}$ is determined by effecting serial-parallel conversion using a shift register in place of the line memory LM of the auxiliary-scanning direction adding unit 40 and adding the image data $T_{ij}^*$ in the main scanning direction. The image data $T_{ij}$ is expressed as follows:

$$T_{ij} = (T_{ij-1}^* + T_{ij}^* + T_{ij+1}^*) \quad (10)$$

Incidentally, the relationship between the smoothed image data $U_{ij}$ determined from the equation (1) and the in-mask added image data $T_{ij}$ is derived as follows:

$$T_{ij} = M^2 U_{ij} \quad (11)$$

The in-mask added image data $T_{ij}$ is then inverted. Thereafter, the adder 44 adds (actually subtracts) the image data $T_{ij}$ to data obtained by multiplying the image data $S_{ij}$ supplied from the selector 38 to the multiplier 43 by $M^2$ in the multiplier 43, and supplies the added data to the storage unit 46. In the storage unit 46, data $K \cdot (M^2 \cdot S - T)$ is determined from the data supplied from the adder 44 and the sharpness enhancement coefficient K supplied from the CPU 30, and supplied to the divider 47. In the divider 47, the data is divided by the data $M^2$ supplied from the CPU 30, and the so-divided data is applied to the adder 48. Further, the adder 48 adds the image data $S_{ij}$ to the divided data so as to produce the image data $S_{ij}^*$ represented by the equation (2). Incidentally, the accuracy of calculation can be improved by using the image data $T_{ij}$ defined as the equation (10) as an alternative to the smoothed image data $U_{ij}$ defined as the equation (1).

The image data $S_{ij}^*$ is output to the work station or the like, where it is subjected to a desired editing process. Here, the image data $S_{ij}^*$ has been processed for enhancement of sharpness according to the pixel density readable by the work station or the like. Therefore, the degree of the sharpness enhancement with respect to an image is not affected by the pixel density, and the same sharpness enhancement can be achieved at all times.

Incidentally, a description has been made of the sharpness enhancing process in the present embodiment. However, the present embodiment can bring about the same effects even when a smoothing process (a process for obtaining the smoothed image data U) is carried out.

According to the present invention, as has been described above, the area of image data which is of an object of either a smoothing process or a sharpness enhancing process, is set up according to the pixel density of output image data. Further, a sharpness enhancement coefficient is also set up as required. Therefore, image data which has been subjected to a given process, can be obtained without depending on the pixel density.

Having now fully described the invention, it will be apparent to those skilled in the art that many changes and modifications can be made without departing from the spirit or scope of the invention as set forth herein.

What is claimed is:

1. A sharpness enhancement processing apparatus for processing image data S set and output in a predetermined pixel density for enhancement of sharpness, using image data surrounding said image data S, comprising:

range setting means for setting an area of said surrounding image data based on said predetermined pixel density;

smoothed image data generating means for processing said image data S for smoothness using only said surrounding image data that falls within the area set by said range setting means, to thereby produce smoothed image data U; and image data generating means for generating sharpness-enhanced image data S* defined as $S^* = S + K \cdot (S-U)$, using said image data S, said smoothed image data U and a predetermined sharpness enhancement coefficient K.

2. A sharpness enhancement processing apparatus according to claim 1, wherein the area of said surrounding image data and said sharpness enhancement coefficient K are set in a look-up table and each correspond in predetermined relationship to the pixel density.

3. A sharpness enhancement processing apparatus according to claim 1, wherein said smoothed image data generating means comprises a plurality of storing means for storing therein image data as line data arranged in a main scanning direction, selecting means for selecting image data, arranged in the main scanning direction and in an auxiliary scanning direction, corresponding to the area of said surrounding image data from said storing means, adding means for adding said selected image data together, and dividing means for dividing said added image data by the number of said selected image data.

4. A method of processing digital image data input via an image reader into in an image data processing system, which system requires the image data to be converted from a first pixel density to a second pixel density, comprising the steps of:

converting the image data input via the image reader from the first pixel density to the second pixel density;

setting a pixel area that is substantially proportional to the second pixel density;

retrieving, along with converted image data for a given pixel, converted image data for any surrounding pixels that are adjacent to the given pixel and that fall within the set pixel area; and for the given pixel, generating smoothed image data by performing a smoothing operation on the retrieved data.

5. The method according to claim 4, further comprising the step of:

selecting the second pixel density to be a desired pixel density by inputting the desired pixel density into the image data processing system.

6. The method according to claim 4, wherein:

S represents the converted image data;

U represents the smoothed image data; and

K represents a predetermined sharpness enhancement coefficient;

and further comprising the step of:

producing sharpness-enhanced image data S* through a process defined by the following equation:

$$S^* = S + K \cdot (S-U).$$

7. An image data processing system, which requires image data input via an image reader to be converted from a first pixel density to a second pixel density, and which performs smoothing and sharpness-enhancement operations, comprising:

a pixel density converter that converts the image data input via the image reader from the first pixel density to the second pixel density; and a sharpness enhancement processing circuit which comprises:

a pixel area setting means for setting a pixel area that is substantially proportional to the second pixel density;

a storage and selection means for selecting image data for both central pixels and pixels that surround the central pixels, whereby the surrounding pixels selected must fall within the set pixel area, and outputting the selected image data;

a smoothing processor which performs a smoothing operation on the selected image data to produce smoothed image data; and a sharpness enhancement processor which performs a sharpness-enhancing operation on the smoothed image data, to produce sharpness-enhanced image data, in accordance with an equation:

$$S^* = S + K \cdot (S-U),$$

where

S* represents the sharpness-enhanced image data;

S represents the selected image data;

U represents the smoothed image data; and

K represents a predetermined sharpness enhancement coefficient.

8. A method according to claim 4, wherein the pixel area is represented by M and is set so as to meet the following condition:

$$(1/\rho \cdot M = C \text{ (C: constant value)}$$

where $\rho$ = the second pixel density, and

M = a mask size substantially proportional to the second pixel density.

9. A method according to claim 8, wherein said constant value C is set so as to fall within a range of 200 μm to 250 μm.

10. A method according to claim 4, wherein the converted image data for the given pixel is represented by $S_{ij}$ (i=1, ... m, j=1, ... n) and is converted into the smoothed image data for the given pixel, represented by $U_{ij}$, through a process defined by the following equation, where M×N defines the set pixel area and M and N each are substantially proportional to the second pixel density:

$$U_{ij} = \sum_{k=i-L}^{i+L} \cdot \sum_{L=j-P}^{j+P} \cdot S_{kL}/(L \cdot P)$$

[wher $L = (M-1)/2, P = (N-1)/2$].

11. A method according to claim 6, wherein the sharpness enhancement coefficient K is set in accordance with a mask size of the pixel area.

12. A method according to claim 11, wherein a relationship between the sharpness enhancement coefficient K and the mask size, which is represented by M, is set in accordance with a curve which passes through points in a vicinity of points (K, M)=(6, 3), (2.5, 5), (1.5, 7), (1, 11).

* * * * *